Oct. 25, 1927.

R. BOWEN 1,646,385

APPARATUS FOR FABRICATING AGGLOMERATED MASSES

Filed March 13, 1924     8 Sheets-Sheet 1

Inventor

Richard Bowen

By Duell, Warfield & Duell

Attorney

Oct. 25, 1927.　　　　　　　　　　　　　　　　　1,646,385
R. BOWEN
APPARATUS FOR FABRICATING AGGLOMERATED MASSES
Filed March 13, 1924　　　8 Sheets-Sheet 2

Oct. 25, 1927.
R. BOWEN
1,646,385
APPARATUS FOR FABRICATING AGGLOMERATED MASSES
Filed March 13, 1924
8 Sheets-Sheet 6

Oct. 25, 1927.  
R. BOWEN  
1,646,385  
APPARATUS FOR FABRICATING AGGLOMERATED MASSES  
Filed March 13, 1924  
8 Sheets-Sheet 7

Inventor
Richard Bowen

By Duell, Warfield & Duell
Attorney

Oct. 25, 1927.   R. BOWEN   1,646,385
APPARATUS FOR FABRICATING AGGLOMERATED MASSES
Filed March 13, 1924   8 Sheets-Sheet 8

INVENTOR
Richard Bowen
BY
Duell, Warfield & Duell
ATTORNEY

Patented Oct. 25, 1927.

1,646,385

UNITED STATES PATENT OFFICE.

RICHARD BOWEN, OF COLUMBUS, OHIO, ASSIGNOR TO SUPER COAL PROCESS COMPANY, OF AUGUSTA, MAINE, A CORPORATION OF MAINE.

APPARATUS FOR FABRICATING AGGLOMERATED MASSES.

Application filed March 13, 1924. Serial No. 698,831.

This invention relates to an apparatus designed for the fabrication of agglomerated masses, and in one of its more specific aspects to apparatus for the fabrication of agglomerated masses to be used as fuel.

The general object of this invention is to provide an improved, efficient and reliable apparatus which is adapted for the improved fabrication of agglomerated masses. Specifically an object of this invention is to provide an improved apparatus for the fabrication of fuel masses from carboniferous material and binder which have a uniform texture throughout, and in particular to provide apparatus for the practice of the process of fabricating agglomerated masses set forth in copending application, Serial No. 684,681, filed January 5, 1924.

Other objects of the invention will be in part obvious and will in part appear hereinafter.

The invention accordingly comprises the features of construction, combinations of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which.

Figure 1:
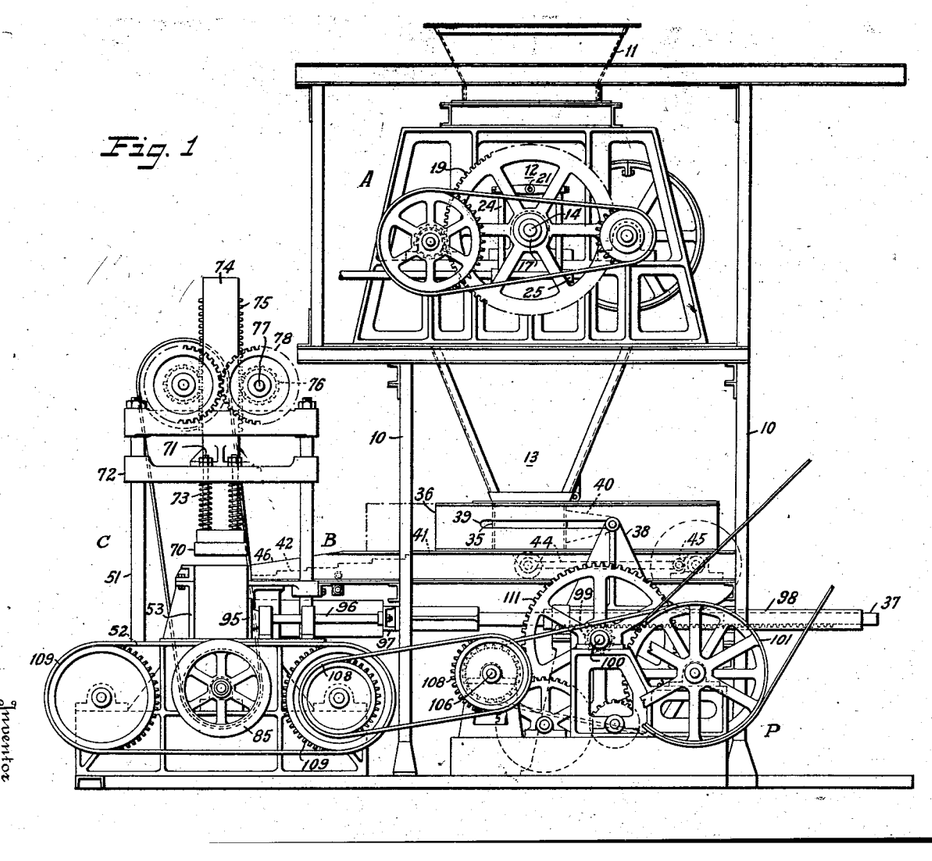
Figure 1 is a side elevation of apparatus constructed in accordance with this invention.

Referring now to the drawings, and more particularly to Fig. 1, the numeral 10 denotes the framework of the apparatus which supports and retains in co-operative relation the several means which mix together and condition the ingredients to be agglomerated and compacted so as to make a product which has a substantially uniform density throughout.

The means for mixing the ingredients comprises the device shown generally at A, which is supported on the framework 10. From the mixing device the mixed mass is made to pass on to a means for working it, which is shown generally at B, as by such an operation the mixed mass is finally conditioned preparatory to being compacted. From the working means the mixture enters the compacting means, which is shown generally at C; the compacting agency being the periodic force resulting from the yielding application of high frequency vibrations. The form of the apparatus here shown is particularly adapted for use as a unit in a battery of such apparatus operated for the continuous fabrication of highly compacted agglomerated masses.

*The mixing device.*

The mixing device, as illustrated, has an upper hopper 11, a mixing chamber 12 and a lower hopper 13 adapted to receive the mixture, when sufficiently mixed. Within the mixing chamber, as shown more clearly in Fig. 6, there is disposed a rotatable shaft 14, to which mixing blades 15 are secured. These blades are so disposed that the projections of their edges upon the axis of the shaft 14 meet it at an acute angle.

Figure 6:
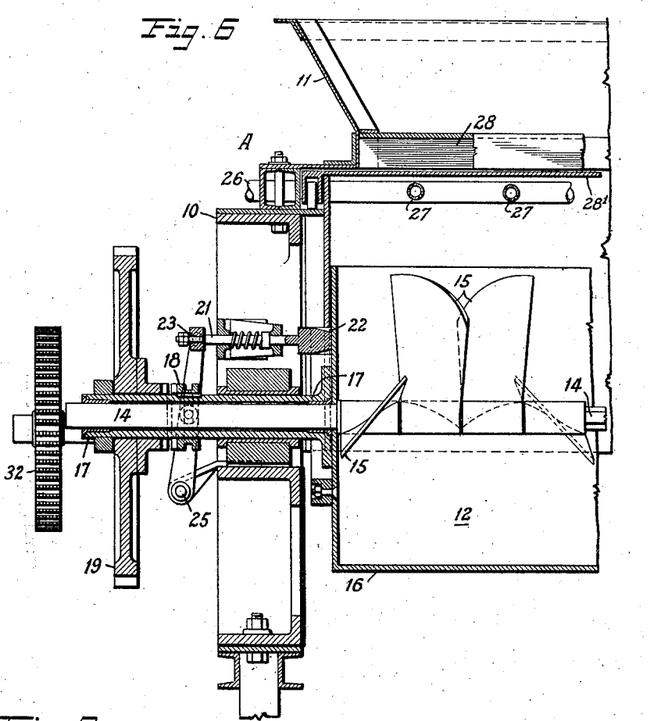
Fig. 6 is a fragmentary sectional view of the mixing device shown in Fig. 5.

Arranged to pivot about the shaft 14 is a swinging bottom 16 having a rigidly secured sleeve 17 which serves as a bearing for the shaft 14 and is actuated through a sliding collar 18, the latter being keyed to the sleeve 17, as indicated. The collar is adapted to be moved axially at will into and out of engagement with a constantly rotating gear 19, which normally rotates on the sleeve 17, as an idler. When the collar 18 is slid into engagement with gear 19, power is transmitted therefrom to the sleeve 17 to move the bottom 16 into an upper inverted position to discharge the mixed batch into the lower hopper 13.

A stop is provided for the bottom 16 in order to insure that it will come to rest in proper registry when swung into lower position. This stop includes a latch bar or plunger 21, which is resiliently pressed into a groove 22 in the upper part of the end wall of the bottom 16. This latch bar or plunger is connected at 23 with a lever 24, which is pivoted at 25 and arranged to actuate the sliding collar 18. Thus when it is desired to apply power to move the bottom 16, the plunger 21 is automatically removed from engagement with the groove 22, thereby releasing the bottom to be moved by the gear 19. When the bottom is swung back to the lower position, and as it approaches the desired point of rest, the collar 18 is disengaged from the gear 19, the momentum with which the bottom is moving carrying it on to a position where the plunger 21 will snap into engagement with the groove 22, thereby holding it stationary and fixed in the desired lower position.

Within the mixing chamber 12 there is disposed a grid of pipe 26, provided with transverse sections 27 having perforations in their lower surfaces. These transverse sections are disposed near the top of the mixing chamber above the mixing blades 15 and are adapted to discharge downwardly a heating medium such as steam to heat and assist in the proper mixing of the ingredients. Just above the grid and at the base of the upper hopper 11 there are disposed a plurality of triangular transverse bars 28 which aid in attaining the proper distribution of the ingredients which are poured into the hopper within the mixing chamber. Just below the bars 28 is disposed the transversely movable valve 28', which is adapted to close the top of the mixing chamber when desired.

Figure 7:
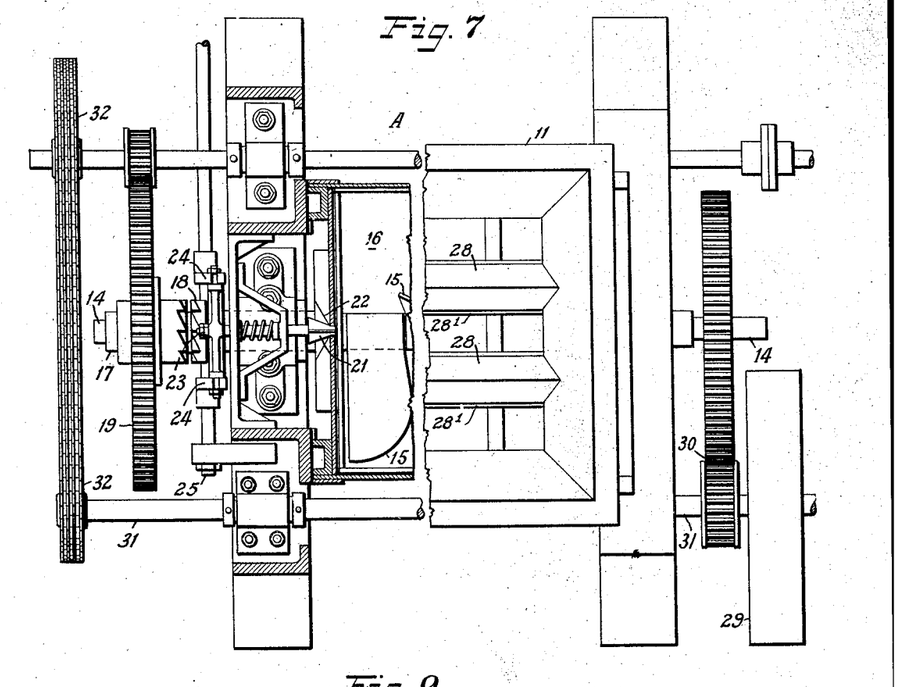
Fig. 7 is a view partly in section and partly in plan (parts being broken away) showing the mixing device as viewed from the top.

The mixing device, as shown more clearly in Fig. 7, is actuated from the single pulley 29, which through suitable gearing 30 rotates the shaft 14. This pulley 29 has power shafting 31 which transmits power through gearing 32 to actuate the idler gear 19.

Figure 2:
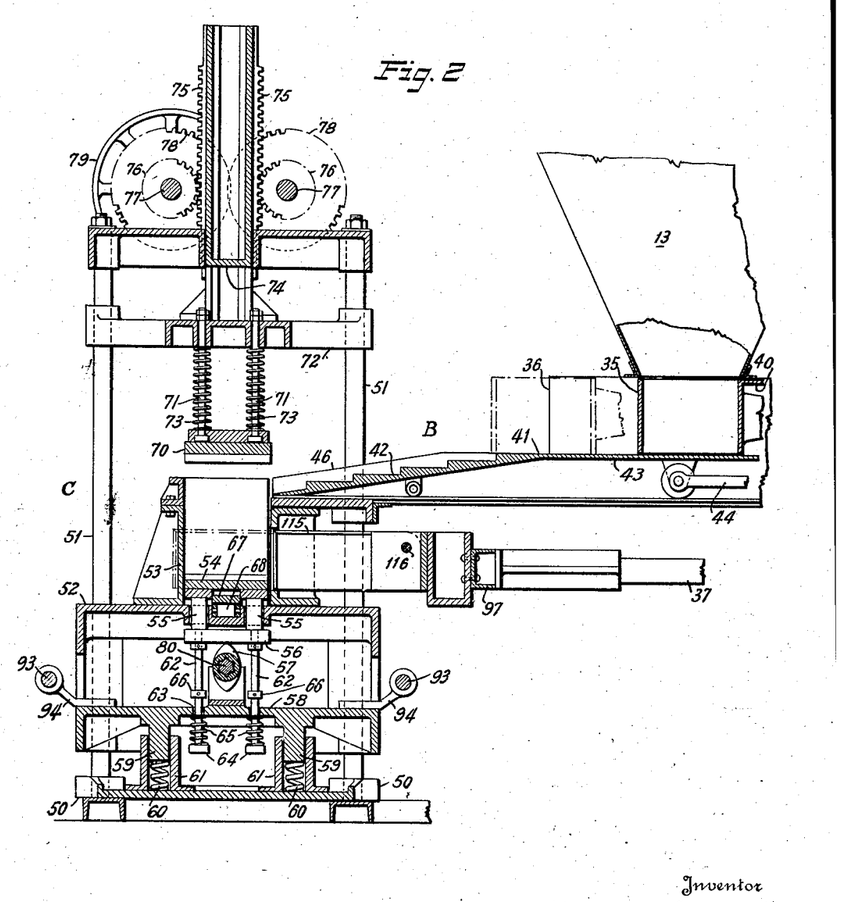
Fig. 2 is a fragmentary view of the apparatus shown in Fig. 1, parts being shown in section, in order better to illustrate the invention.

Beneath the lower hopper 13, as shown more clearly in Fig. 2, is disposed a movable closure or box 35, which has neither top nor bottom, and slides in ways 36 to a protracted position, indicated by the broken lines. This movement is effected at will by means of the power actuated reciprocating bar 37 to which is connected the triangular cross-head 38, the latter being connected to the box 35, through the slotted opening 39, which is formed in the side of the ways 36. The box 35 has a rearwardly extending projection 40 formed flush with its upper edge, which is adapted to serve as a valve to close the mouth of the lower hopper 13 when the box is moved to the protracted position. In this position the box 35 is adapted to feed the portion of the mixture which it has received from the lower hopper 13 onto the working means shown at B.

*The working means.*

The working means includes a movable table 41 having an inclined stepped surface 42 and a rearwardly extending projection 43, to which the pitman 44 is connected in order to impart a regular reciprocating movement. This pitman is actuated by the constantly rotating crank 45. Each reciprocation of the movable table 41 is thus seen to shear off a portion of the mixed batch contained in the box 35. The rate of reciprocation is such that the portions of the mass on the respective steps are flipped under their own inertia from step to step at each reciprocation. Fixed sides for the stepped surface of the table are provided at 46, which guide the mass portions in their passage to the compacting means, shown at C.

*The compacting means.*

The mixing device and the working means, operating thus successively upon the mass, function conjointly to bring it into a proper condition of temperature and viscosity to be operated upon by the compacting means. The mixing device and working means may thus be collectively regarded as a conditioning means.

The compacting means includes a machine having a bed 50 provided with upwardly projecting standards 51 to which is rigidly secured the main plate 52, the latter being arranged rigidly to support the sides 53 of a mold box in which the compacting operation takes place. The bed 50 and its standards may be considered as a portion of the frame 10, so that it is seen that the mold box is supported in substantially fixed relation with respect to the frame 10. The mold box has a movable bottom or pallet 54 which is so mounted as to have at least one degree of freedom of motion, and as shown is adapted to be reciprocated vertically by the vertically movable plungers 55 which are rigidly secured to a tappet plate 56. This tappet plate is disposed above and receives periodic impacts from a rotating cam 57, which is mounted on an auxiliary plate 58. This auxiliary plate is movable vertically and to this end is made to slidably engage with standards 51 and has plungers 59 which are supported by relatively stiff springs 60 disposed in suitable sockets 61 formed in the bed of the machine.

The tappet plate 56 is held in place by means of rods 62 which extend downwardly through suitable openings 63 in the auxiliary plate 58. Between enlarged ends 64 of the rods 62 and the under side of the plate 58 there are disposed springs 65 which exert a downward pull on the tappet plate 56 so as to keep it in a normally depressed position. The rods 62, however, are preferably provided with collars 66 which are adapted to contact with the upper surface of auxiliary plate 58, so as to provide a fixed lower limit for their depression. The impacts from the rotating cam 57 thus cause the tappet plate to move periodically from the fixed lower position in an upward direction against the force of the springs 65.

Figures 12, 13:
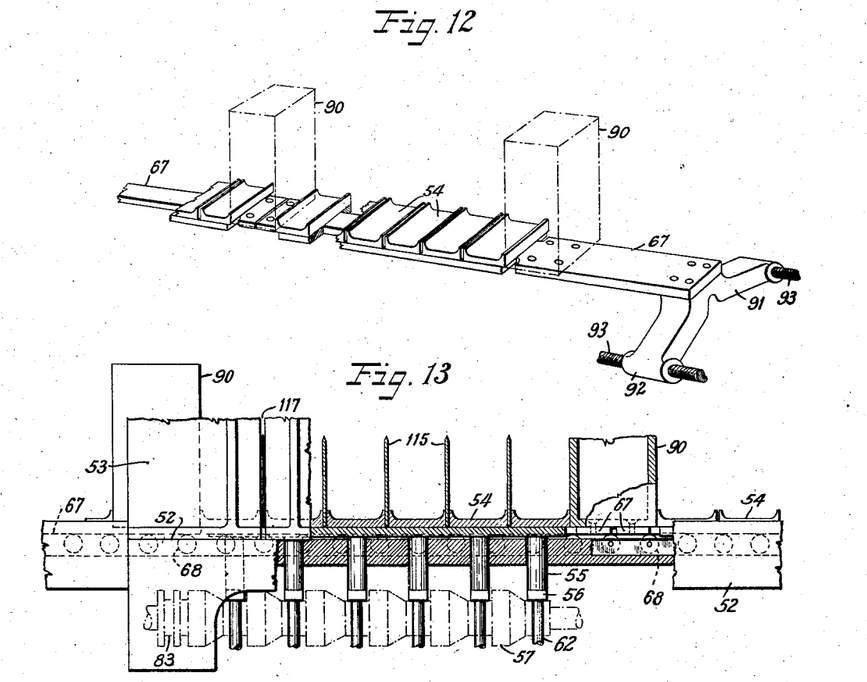
Fig. 12 is a perspective view showing details of a pallet and tappet plate used in this invention.
Fig. 13 is a side elevation showing the manner of mounting the pallet.

The movable pallet 54, as indicated more clearly in Figs. 12 and 13, has a saddle-like construction which rides astride the movable bar 67, the latter being adapted to roll on a plurality of antifriction rollers 68 rotatably mounted in the main plate 52.

Arranged to bear downwardly upon the mass which is to be compacted in the mold box is a pressure plate 70. This plate is attached by means of rods 71 to the movable weight or plate 72, which also slides on standards 51. About the rods 71 and between the plate 70 and the weight 72 are disposed springs 73. The rods 71 are arranged to pass freely through the weight 72 in order that the force of its weight may be yieldingly applied through the pressure surface 70 to the top of the mass in the mold box 53. The weight 72 has an upwardly extending plunger 74 having rack teeth 75 which are engaged by pinions 76 disposed on shafts 77 rotatably mounted on the top of the machines. On the ends of these shafts are disposed the engaging gears 78, one of which, as indicated at 79, is power driven, the power being applied at will in order to lift the pressure surface from the top of the mass in the mold box when desired.

Figure 3:
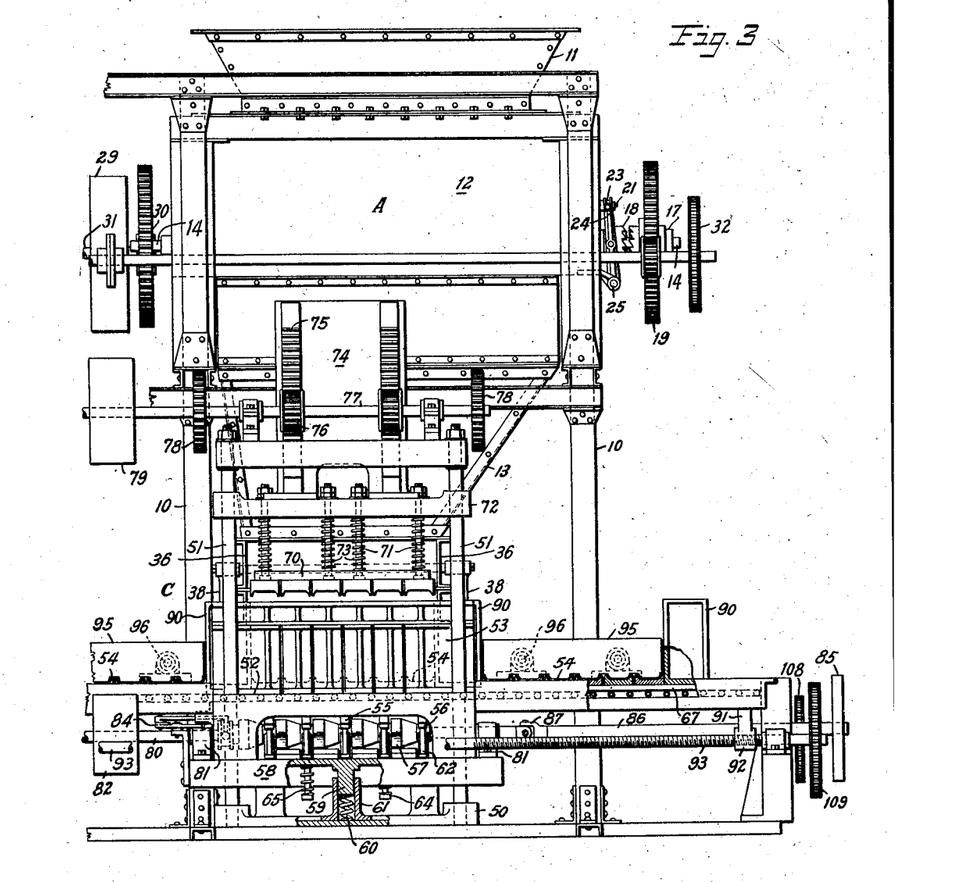
Fig. 3 is a front elevation of the apparatus shown in Fig. 1.

The shaft for rotating the cam 57 is shown at 80 and is adapted to revolve in fixed journals 81 disposed on the movable auxiliary plate 58. This shaft 80 is arranged to be constantly driven by power applied to the pulley 82 disposed thereon. This shaft, as indicated more clearly in Fig. 8, also has a plurality of grooves 80' formed longitudinally thereof. The cam 57 preferably is made of a plurality of generally conical interengaging sections, (the means for effecting interengagement being later described), which, when assembled are splined to the shaft, and arranged to slide axially therealong. As shown clearly in Figs. 12 and 13, the pallet 54 is also preferably made in a plurality of sections, to each of which corresponds a section of the tappet plate 56 and a section of the cam 57. Each section of the cam is therefore adapted to impart periodic impacts to its respective portion of the tappet plate, which in turn imparts such force to its respective portion of the pallet. An axial movement, however, of the cam, displaces its eccentric portion from immediately under the tappet plate until a circular portion of the cam comes into place. In this displaced position the revolving cam imparts no impacts to the tappet plate. It is thus seen that the application of the impacts to the pallet may be started or stopped simply by displacing the cam axially upon the shaft 80, thereby avoiding the overcoming of the inertia of the cam parts each time it is desired to start or to stop applying the impacts which produce vibrations. As a means to effect this movement, a collar is shown at 83 (see Fig. 8) which is adapted to be engaged by suitable manual actuating connections 84, pivoted to the main plate 52, as shown in Fig. 3.

The shaft 80, revolving in journals 81 which are disposed on the auxilary plate 58, will participate in the transient vertical movements of this plate. In order, however, to give this shaft and its rotating system considerable capacity for storing energy to be imparted to the tappet plate, it is provided with a fly wheel, shown at 85, on a section of the shaft 86 which is flexibly connected at 87 to the vertically movable portion journaled on the auxiliary plate 58.

The bar 67, as illustrated, comprises three sections, which are set off by the mold ends 90, made in the form of cast metal blocks rigidly secured to the bar. One section is thus always adapted to be between the mold sides 53 to support the masses that are compacted. This bar is moved rectilinearly at will to the right or to the left from between the mold sides to discharge the compacted mass. For this purpose the bar 67 has a cross-head 91 secured to one end, though preferably such cross-heads are provided at both ends. This cross-head has nuts 92 in which turn the screws 93, supported in parallel relation at the side of main plate 52 by brackets shown at 94. These screws are actuated at will.

To discharge the compacted masses from the pallets on the section of the bar 67, which has been moved out from between the mold sides 53, a vertical upstanding plate 95 is provided at each end of the mold box, which is attached to a pair of plungers 96, adapted to push such plate 95 broadside transversely across the pallets 54 and sweep the supported masses therefrom. The plungers 96 are fixed to a relatively long cross-head 97 disposed at the rear of the compacting machine and supported and moved by a pair of the reciprocating bars shown at 37 and arranged to slide in the horizontal ways 98 that are secured to the frame 10.

These reciprocating bars 37, as more clearly shown in Fig. 1, are in the form of racks which are respectively actuated by pinions 99 secured on the main shaft 100, which is also arranged to be actuated at will.

The power means.

Figure 4:
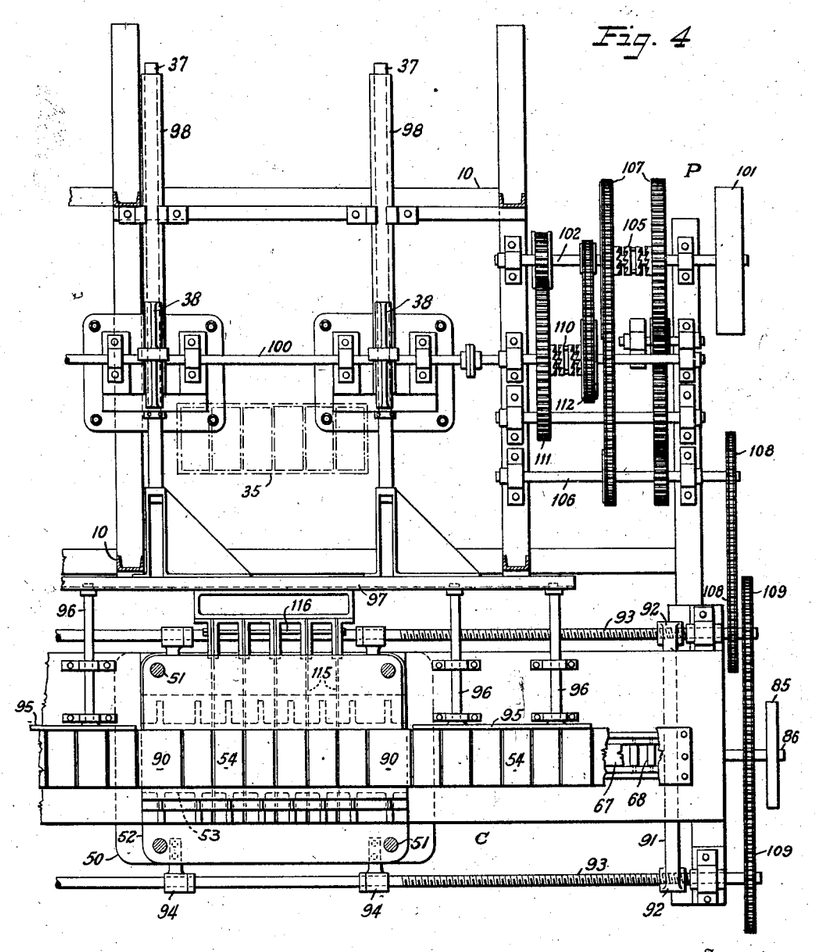
Fig. 4 is a view mainly in plan of the same apparatus.
Figure 5:
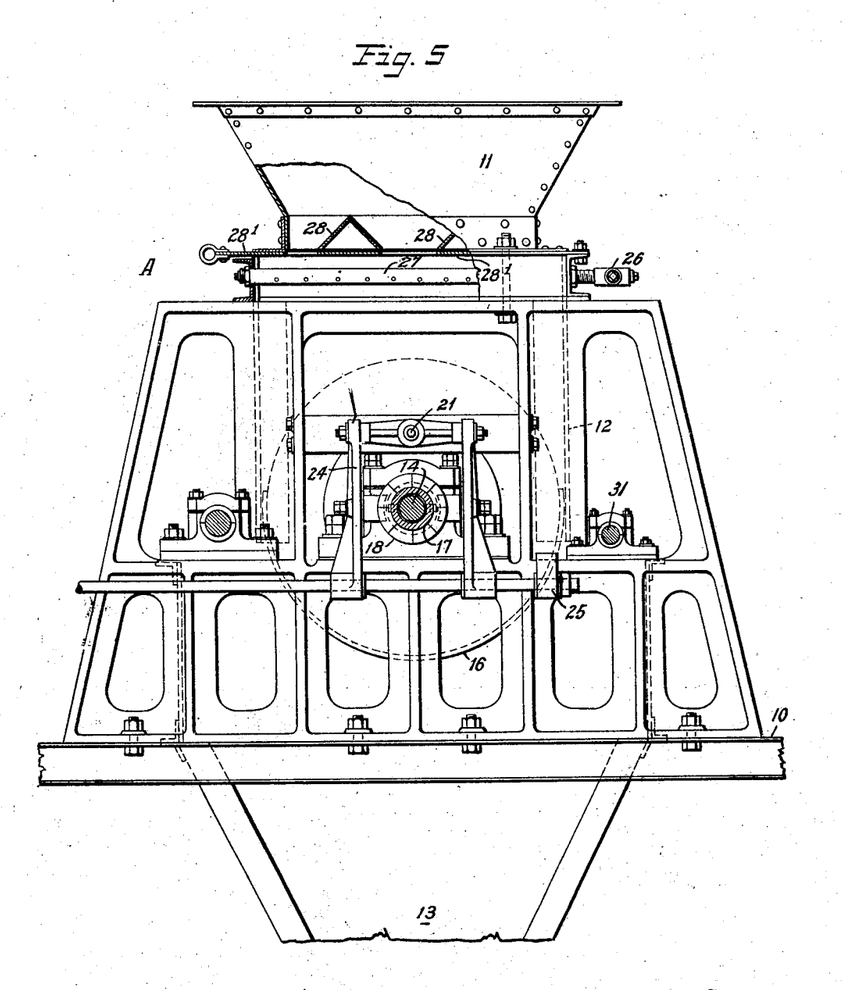
Fig. 5 is an enlarged view partly in section and partly in side elevation showing an end view of the mixing device employed in connection with this apparatus.

In order to provide suitable actuating means for both the screws 93 and the shaft 100, a power unit, as indicated generally at P in Figs. 1 and 4, is provided as an element of this apparatus. This power unit is driven from the pulley 101 arranged to drive the shaft 102. On this shaft is a reversing clutch 105, adapted to transmit motion to the shaft 106 through one or the other of the trains of gearing shown at 107. The shaft 106, in turn, drives the sprocket gear 108, which is arranged to actuate the gears 109, disposed on the outer ends of the screws 93. It is thus seen that when the clutch at 105 is thrown to the right or to the left, motion to rotate the screws 93 in one direction or the other is transmitted through the gearing at 107, the sprocket at 108 and its connections.

In order to actuate the shaft 100 at will, this shaft is provided with a reversing clutch at 110, which is adapted to engage at will with the train of gearing 111 or 112, which are driven from the shaft 102.

In order that the masses in the mold box at 53 may be compacted as separate units on each of the pallets 54, a plurality of dividing blades 115 are provided (shown particularly in Fig. 2), which are pivotally attached at 116 to a portion of the transverse cross-head 97. These blades are adapted to be inserted through suitable slots as shown at 117 in the wall of the adjacent mold side 53. These blades, when inserted, are adapted to pass between the sections of the pallet 54 and thus provide dividing walls for the mass in the mold box at 53.

The operation.

In operating the apparatus above described, the components to be agglomerated are first placed in the hopper at 11 and fed to the mixing chamber as desired. The components may be, for example, comminuted coal and coal tar pitch, which may be taken in the amounts taught in my copending application Serial No. 684,682 filed Jan. 5, 1924, or, typically, in the ratio of ten parts of coal to one of the pitch. These components are mixed together and agitated by the revolving blades 15 in the presence of live steam injected from the transverse pipe sections 27, the temperature of which is substantially from 250° to 350° F. When suitably mixed the lever 24 is thrown to couple the continuously revolving idler gear 19, mechanically to move the bottom 16 so as to discharge the mixture into the lower hopper 13. The clutch at 110 is then actuated to move the reciprocating bar 37 and the enclosure 35 to a point where the closure is beneath the lower opening of the hopper 13 to receive a charge. When charged, the clutch at 110 is again actuated to move the closure 35 to the protracted or broken line position indicated in Figs. 1 and 2.

The table 41, which is being constantly reciprocated, now shears off a portion of the charge as it protrudes from the bottom of the closure 35. Successive reciprocations of the table 41 cause each portion so sheared off to flip from step to step of the table until it is finally flipped from the lower edge of the table and falls into the mold box 53.

Just prior to this falling of portions of the mixed mass into the mold box, the cam 57 is shifted on the constantly rotating shaft 80 so as to impart vibratory impacts to the pallets 54. These pallets are thus kept in a constant state of vibration during the whole time required to fill the mold box. The charge in the closure 35 is, of course, such as preferably to fill the mold box to the desired height. When filled, the plunger 74 is moved downwardly from its elevated position and made free so as to press the pressure plate 70 upon the surface of the mass to be compacted in the mold box. It should be observed that the movement of the reciprocating bar 37, which moves the closure 35 to the protracted position also inserts the blades 115 in the mold box so as to provide the partitions which sectionalize the mass as the several portions are discharged from the working table into the mold box.

The preliminary vibration of the mass in the mold box while being filled facilitates the removal of air bubbles and the like from the mass and tends to compact it. When the pressure plate 70 is applied, the operation of actual compacting takes place. During this operation vibratory impacts of relatively high frequency are transmitted directly to the mass which traverse the same and appear to be reflected at the pressure plate 70 back into the mass, thus materially intensifying the effect of the vibrations applied. The mass particles as a result, move relatively orienting thereunder into smaller and smaller spaces until a closely knit and interfitting compact structure in the mass results.

Since the cam 57 is mounted on a yieldingly supported base, namely on the auxiliary plate 58, its impacts are yieldingly applied to the mass which is also being yieldingly pressed downwardly by the plate 70 against the hammer element, or pallet 54 which imparts the impact. This resilient gripping of the mass to be compacted results in substantially a maximum utilization of the vibratory impacts to effect a very high degree of compacting without crushing the particles in the mass, all of which is accomplished in a relatively short period of time.

A mass having the composition indicated above may be compacted and thereby contracted so as to have substantially one-half to one-third of its original volume. When accomplishing this, the shaft 80 should be revolved with an angular velocity, such as to impart in the neighborhood of 1800 reciprocations per minute to the tappet plate 56, since in the practice of the process disclosed in my copending application above referred to, it is desired to impart the vibrations to the mass at such a rate that there will be relative particle acceleration in the mass being compacted as distinguished from a mass acceleration of the whole in which the rise and fall, imparted by a slowly revolving cam, of the tappet plate would follow the cam surface throughout the revolution. As against this latter the angular velocity of the cam here employed is such that the tappet plate receives a sufficient impact by reason of the change in kinetic energy to cause the latter to rise under its own momentum, free from the cam, and then fall freely back to receive the next succeeding impact.

As the weight at 70 moves down upon the mass being compacted, less and less of the momentum imparted to the tappet plate 56 will be absorbed in displacing the particles of the mass. Consequently more and more of the impact will be reflected as a reaction upon the cam as the period for compacting draws to a close. It is during this closing portion of the compacting period that the springs at 60 function to relieve the shaft 80 of the severe transverse strains which would result from this reaction. By this means the rapidly rotating cam is thus permitted still to impart pure impacts to the tappet plate and rebound therefrom without imparting substantial tangential components thereto which would otherwise impede the vibratory impacts, that it is desired to communicate to the mass being compacted. The springs at 60 by relieving the shaft 80 of the transverse strains also lengthens the useful life of the shaft 80 quite materially.

By imparting impacts at a frequency of 1800 reciprocations a minute or over, masses having the above composition and measuring 4 x 6 x 8 inches, as a finished product, may be compacted in from ten to fifteen seconds to have a resulting structure of uniform texture throughout, the density being equal to and generally in excess of the best grades of anthracite.

When the compacting operation has been completed, the manually operating connections at 84 are operated to shift the cam 57 to its neutral position, where no motion is imparted to the tappet plate 56. The clutch at 110 is now actuated to withdraw the blades 115, and incidentally to move the closure 35 to position again to receive a charge from the hopper 13. The clutch at 105 is now actuated to revolve the screws 93 to remove the masses just compacted from the mold box. When thus completely removed, another section of pallets 54 is brought in place in the mold box. The section containing the masses just compacted is thus removed by movement either to the right or to the left of the mold box as the case may be. When the clutch at 110 is next actuated to move the closure 35 to the protracted position, it is seen that the plates 95 are simultaneously moved across the pallets 54, thereby sweeping at one stroke from the pallets all the compacted masses so that they may be conveyed away to a place of use or storage. This movement of the closure is accompanied by the replacing of the blades 115 in position in the mold box and the cycle of operation for compacting another charge drawn from the hopper 13 is begun. The apparatus of this invention is thus seen to be adapted for a continuous cycle of operations by which compacted agglomerated masses are produced.

*Modifications.*

Figures 9, 10, 11:
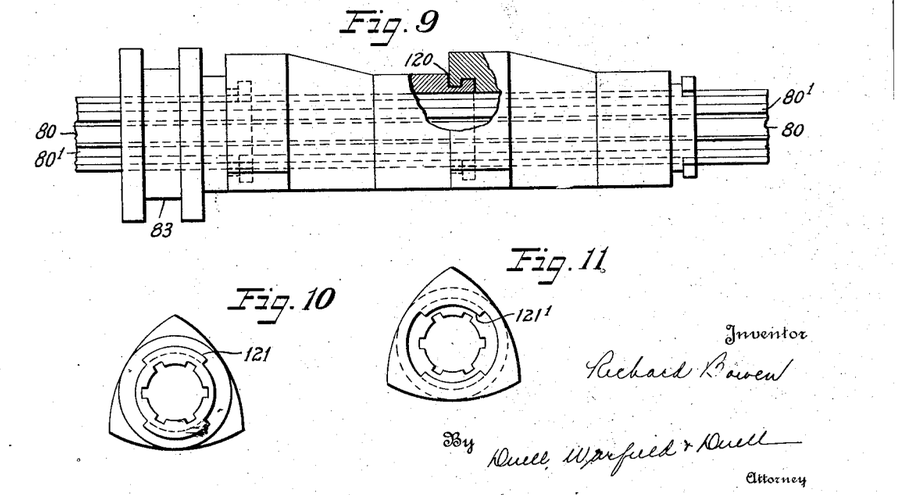
Figs. 9, 10 and 11 show details of a modified form of cam adapted to be used in connection with this invention.

A modified form of cam is shown in Fig. 9 in which the cam is shown as somewhat triangular in cross section as illustrated in Figs. 10 and 11. The cam thus provided has three cusps which are adapted to impart either a greater number of reciprocations to the tappet plate 56 for the same number of revolutions of the shaft 80 or to permit revolving the shaft 80 at a lower angular velocity to get the same number of reciprocations.

Figure 8:
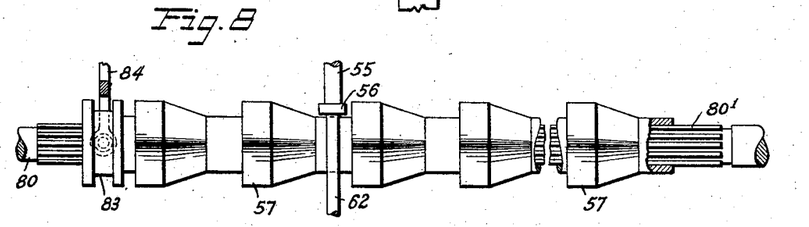
Fig. 8 is an enlarged view in elevation of the cam illustrated in Fig. 2.

Fig. 9 also illustrates certain preferred forms of cam details, namely the removable sectional nature of the cam. The cam 57 may, of course, be one integral element formed to have a plurality of sections, as shown in Fig. 8, or it may be preferable for structural reasons to make the cam sections separable and united by suitable means, for example, the interlocking collars, shown in Figs. 9, 10 and 11. This collar construction is indicated at 120 and comprises an overlapping section 121, which has an arcuate length substantially one-fourth of the circle and is adapted to engage bayonet fashion with a similar arcuate collar section 121' on the adjacent section. The cam thus composed of separable sections would have the several sections fitted in interlocking relation on the shaft 80, assembly and disassembly of the cam being effected by rotating the cam sections through angles of 90°. When assembled, the grooved shaft would be slipped into place, the sections thereby being locked in position.

Figure 14:
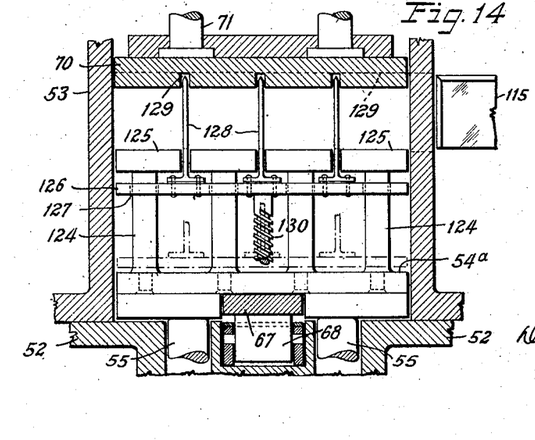
Fig. 14 illustrates a modified form of the apparatus shown in Fig. 2.

In Fig. 14 a modification of the compacting machine is shown whereby blades are provided which are movable into the mold box vertically. Instead of the pallet sections 54, shown in Fig. 2, there are shown in this modification the saddle sections 54ᵃ, which straddle the bar 67 in substantially the same manner as do the pallet sections, these saddle sections being adapted to receive vibratory impacts from the plungers 55 in the same manner as do the pallet sections 54. Each of the saddle sections 54ᵃ has secured therein a plurality of upstanding columns 124, each of which is surmounted by a small square or rectangular pallet section 125. In the space between the saddle sections 54ᵃ and the small pallet sections 125 there is disposed a plate 126, which is perforated, as shown at 127, to accommodate the columns 124, and adapted to slide vertically therealong. The plate 126 is made as an integral or rigid body adapted to cover the whole of the mold box floor and is therefore made to have as many perforations at 127 as there are colums 124 in the mold box. The holes at 127 are made suficiently large to afford clearance for the individual motions of the various columns 124 when vibrated.

On the plate 126 there are disposed in upstanding relation a plurality of small blades 128, which are adapted to project up between the small pallet sections 125. These blades 128 may be made long as is the mold box at 53, but where the blades 115 are employed, the blades 128 are made in sections no wider than a saddle section 54ᵃ. They are thus made to be inserted in what is the bottom of a mold box between the small pallet sections 125 and between the blades 115. The blades 128 will be made to project upwardly to substantially the same height as do the blades 115. The pressure plate 70, which in Fig. 14 is shown in its lowermost position, would accordingly be provided on its under side with a plurality of transverse and longitudinal grooves 129, arranged in checkerboard fashion to accommodate both the blades 128 and the blades 115.

In order to move the blades 128 into and out of the mold box, a plurality of screws 130, preferably one at each end of the plate 126, are provided. These screws, as indicated, have a quick acting thread, and may be disposed in the mold ends 90, and conveniently rotated at will by any suitable means.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. Apparatus adapted for the fabrication of agglomerated masses, comprising, in combination, a mixer adapted to mix together heterogeneous components, means arranged to receive the mass from the mixer and to work it progressively to a desired consistency, and means for compacting the mass by the yielding application of high frequency vibrations.

2. Apparatus adapted for the fabrication of agglomerated masses, comprising, in combination, a mixer adapted to mix together heterogeneous components, means arranged to receive the mass from the mixer and work it progressively to a desired consistency, and means for compacting the mass by the yielding application of high frequency vibrations while subject to compression.

3. Apparatus adapted for the fabrication of agglomerated masses, comprising, in combination, a mixer adapted to mix together heterogeneous components, means arranged to receive the mass from the mixer and work it progressively to a desired consistency, and means for compacting the mass including elements for yieldingly applying high frequency vibrations to the mass and simultaneously applying pressure to an opposite surface.

4. Apparatus adapted for the fabrication of agglomerated masses, comprising, in combination, a mixer provided with a heating element adapted to mix together heterogeneous components while being heated, means arranged to receive the mass from the mixer and work it progressively to a desired consistency, and means for compacting the mass by the yielding application of high frequency vibrations.

5. Apparatus adapted for the fabrication of agglomerated masses, comprising, in combination, a mixer provided with a heating element adapted to mix together heterogeneous components while being heated, means arranged to receive the mass from the mixer and work it progressively to a desired consistency, and means for compacting the mass by the yielding application of high frequency vibrations while subject to compression.

6. Apparatus adapted for the fabrication of agglomerated masses, comprising, in combination, a mixer provided with a heating element adapted to mix together heterogeneous components while being heated, means arranged to receive the mass from the mixer and work it progressively to a desired consistency, means for compacting the mass by the yielding application of both direct and reflected vibrations.

7. Apparatus adapted for the fabrication of agglomerated masses, comprising, in combination, a mixer provided with a heating element adapted to mix together heterogeneous components while being heated, means arranged to receive the mass and work it progressively to a desired consistency, and means for compacting the mass including elements adapted yieldingly to apply high frequency vibrations to the mass and simultaneously to apply pressure to an opposite surface.

8. Apparatus adapted for the fabrication of agglomerated masses, comprising, in combination, a mixer provided with a heating element adapted to mix together heterogeneous components while being heated, means arranged to receive the mass and to work it progressively to a desired consistency, said working means being arranged to prevent loss of heat, and means for compacting the mass by the yielding application of high frequency vibrations while subject to compression.

9. Apparatus adapted for the fabrication of agglomerated masses, comprising, in combination, a mixer provided with a heating element adapted to mix together heterogeneous components while being heated, means arranged to receive the mass and to work it progressively to a desired consistency, said means being arranged to avoid substantial loss of heat during working, and means for compacting the mass including elements adapted yieldingly to apply high frequency vibrations and simultaneously to apply pressure to respectively opposite surfaces.

10. Apparatus adapted for the fabrication of agglomerated masses, comprising, in combination, a mixer provided with revolving blades to mix together heterogeneous components in substantially a state of physical suspension, means arranged to receive the mass and work it to a desired consistency, and means for compacting the mass by the yielding application of high frequency vibrations.

11. Apparatus adapted for the fabrication of agglomerated masses, comprising, in combination, a mixer provided with revolving blades adapted to mix together heterogeneous components while in substantially a state of physical suspension, means arranged to receive the mass and work it to a desired consistency, and means for compacting the mass by the yielding application of high frequency vibrations while subject to compression.

12. Apparatus adapted for the fabrication of agglomerated masses, comprising, in combination, a mixer provided with revolving blades adapted to mix together heterogeneous components while in substantially a state of physical suspension, means arranged to receive the mass and work it to a desired consistency, and means for compacting the mass by the yielding application of both direct and reflected vibrations.

13. Apparatus adapted for the fabrication of agglomerated masses, comprising, in combination, a mixer provided with revolving blades adapted to mix together heterogeneous components while in substantially a state of physical suspension, means arranged to receive the mass and work it to a desired consistency, and means for compacting the mass including elements adapted yieldingly to apply high frequency vibrations and simultaneously to apply pressure to an opposite surface.

14. Apparatus adapted for the fabrication of agglomerated masses, comprising, in combination, a mixer provided with a grid of pipe having orifices adapted to emit streams of a heating medium, and with revolving blades arranged to agitate the mixture in substantially a state of physical suspension, means to receive the mass and work it with the application of a series of impacts, and compacting means including a receptacle for the mass, a movable support and means for yieldingly applying high frequency vibrations to said support.

15. Apparatus adapted for the fabrication of agglomerated masses, comprising, in combination, a mixer provided with a grid of pipe having orifices adapted to emit streams of a heating medium, and with revolving blades arranged to agitate the mixture in substantially a state of physical suspension, means to receive the mass and work it with the application of a series of impacts, and compacting means including a receptacle for the mass, a movable support, means for yieldingly applying high frequency vibrations to said support and means for subjecting the mass in the receptacle to compression.

16. Apparatus adapted for the fabrication of agglomerated masses, comprising, in combination, a mixer provided with a grid of pipe having orifices adapted to emit streams of a heating medium, and with revolving blades arranged to agitate the mixture in substantially a state of physical suspension, means to receive the mass and work it with the application of a series of impacts, and compacting means including a receptacle for the mass, a movable support and means adapted to apply yieldingly both direct and reflected high frequency vibrations to the mass on said support.

17. Apparatus adapted for the fabrication of agglomerated masses, comprising, in combination, a mixer provided with a grid of pipe having orifices adapted to emit streams of a heating medium, and with revolving blades arranged to agitate the mixture in substantially a state of physical suspension, means to receive the mass and work it with the application of a series of impacts, and compacting means including a receptacle for the mass, a movable support, means for yieldingly applying high frequency vibrations to said support and means adapted at the same time yieldingly to apply pressure at the top of the mass on said support.

18. Apparatus adapted for the fabrication of agglomerated masses, comprising, in combination, conditioning means adapted to bring together heterogeneous components into a desired state of fluidity, and compacting means including a receptacle for the mass, a movable support, and means independent of said support for yieldingly applying high frequency vibrations to said support.

19. Apparatus adapted for the fabrication of agglomerated masses, comprising, in combination, conditioning means adapted to bring together heterogeneous components into a desired state of fluidity, and compacting means including a receptacle adapted to receive the mass and a movable support, means for subjecting the mass in the receptacle to compression, and means independent of said support for yieldingly applying high frequency vibrations thereto while subject to compression.

20. Apparatus adapted for the fabrication of agglomerated masses, comprising, in combination, a mixer adapted to mix together heterogeneous components while in substantially a state of physical suspension, means arranged to receive the mass from the mixer and to work it to a desired consistency, and compacting means including a receptacle adapted to receive the plastic mass, a movable support within the receptacle, and means independent of said support for yieldingly applying high frequency vibrations to said support.

21. Apparatus adapted for the fabrication of agglomerated masses, comprising, in combination, a mixer adapted to mix together heterogeneous components and agitate them in substantially a state of physical suspension, means arranged to receive the mass from the mixer and work it to a desired consistency and compacting means including a receptacle, a movable support within the same, and means independent of said support for yieldingly applying simultaneously both direct and reflected high frequency vibrations to the mass within the receptacle.

22. Apparatus adapted for the fabrication of agglomerated masses, comprising, in combination, a mixer adapted to mix together heterogeneous components and agitate them in substantially a state of physical suspension, means to receive the mass from the mixer and work it to a desired consistency, and a compacting means including a receptacle, a movable support within the same, means independent of said support for yieldingly applying high frequency vibrations to said support, and means for yieldingly subjecting the mass within said receptacle to compression.

23. Apparatus adapted for the fabrication of agglomerated masses, comprising, in combination, a mixer provided with a heating element and with revolving blades adapted to mix together the heterogeneous components and agitate them in substantially a state of physical suspension, means arranged to receive the mass from the mixer and to work it to a desired consistency, and compacting means including a receptacle for receiving the mass having a movable bottom, means independent of said bottom for yieldingly applying high frequency vibrations to said bottom, and means for resiliently applying pressure to the top of the mass in said receptacle.

24. Apparatus adapted for the fabrication of agglomerated masses, comprising, in combination, a mixer provided with revolving blades, and with a grid of perforated pipe disposed above the blades and adapted to emit a heating medium, means arranged to receive the mass from the mixer and to work it over a stepped surface, and compacting means including a receptacle for receiving the mass from the stepped surface, a movable bottom in said receptacle and means for yieldingly applying high frequency vibrations to said bottom.

25. Apparatus adapted for the fabrication of agglomerated masses, comprising, in combination, a mixer provided with revolving blades, and with a grid of perforated pipe disposed above the blades and adapted to emit a heating medium, means arranged to receive the mass from the mixer and to work it over a stepped surface, and compacting means including a receptacle for receiving the mass from said surface, a movable bottom in said receptacle, means for subjecting the mass in said receptacle to compression and means for yieldingly applying high frequency vibrations to said bottom.

26. Apparatus adapted for the fabrication of agglomerated masses, comprising, in combination, a mixer provided with revolving blades, and with a grid of perforated pipe disposed above the blades and adapted to emit a heating medium, means arranged to receive the mass from the mixer and to work it over a stepped surface, and compacting means including a receptacle for receiving the mass from said surface, a movable bottom in said receptacle and means for yieldingly applying both direct and reflected vibrations to the mass in said receptacle.

27. Apparatus adapted for the fabrication of agglomerated masses, comprising, in combination, a mixer provided with revolving blades, and with a grid of perforated pipe disposed above the blades and adapted to emit a heating medium, means arranged to receive the mass from the mixer and to work it over a stepped surface, and compacting means including a receptacle for receiving the mass having a movable bottom, means for yieldingly applying high frequency vibrations to said bottom and means for resiliently applying pressure to the top of said mass in said receptacle.

28. Apparatus adapted for the fabrication of agglomerated masses, comprising, in combination, a mixer provided with revolving blades and a heating element, a stepped reciprocating table arranged to receive a mass discharged from said mixer and to work the same with a series of impacts, and compacting means provided with a receptacle for receiving the mass from said table and having a movable bottom, and means for yieldingly applying high frequency vibrations to said bottom.

29. Apparatus adapted for the fabrication of agglomerated masses, comprising, in combination, a mixer provided with revolving blades and a heating element, a stepped reciprocating table arranged to receive a mass discharged from said mixer and to work the same with a series of impacts, and compacting means provided with a receptacle for receiving the mass from said table and having a movable bottom, means for yieldingly applying high frequency vibrations to said bottom, and means for resiliently applying pressure to the top of the mass in said receptacle.

30. A device for working mass mixtures comprising, in combination, a stepped table down which the mass is designed to move while being worked, and means for reciprocating the table at a velocity sufficient to cause the mass to move from one step to another under its own inertia.

31. A device for working mass mixtures comprising, in combination, a working surface, means for progressively moving the mass over the surface, and means for imparting a succession of impacts to the mass while moving over the surface.

32. Apparatus for compacting agglomerated masses, comprising, in combination, means for supporting a mass mechanically to have freedom of motion, means independent of said supporting means for yieldingly applying high frequency vibrations in a regular and continuous manner to said mass, and means for simultaneously subjecting the mass to compression.

33. Apparatus for compacting agglomerated masses comprising, in combination, a rigid frame, side plates supported by said frame, mold ends adapted to form a mold-box and arranged to move relatively to said sides, a bottom for said mold-box supported to have freedom of motion in a vertical direction, means for mechanically transmitting high frequency vibrations in a vertical direction to said bottom, an inertia element adapted to be moved into the top of said mold-box and resiliently apply compression to the mass being vibrated in the mold-box, and resilient means on said frame supporting said vibrating means and arranged yieldingly to absorb the reaction of said vibration.

34. In apparatus for working agglomerated masses, the combination with means for holding charges of mixed material, of a table having a stepped surface, means for continuously reciprocating said table, and a closure formed without top or bottom adapted to be moved into one position to receive a charge from said holding means and provided with an extension whereby when moved into a second position said extension serves as a valve to close said holding means, said closure when moved into said second position being adapted to have the charge sheared off in sections by the stepped surface of said continuously reciprocating table.

35. In apparatus for compacting agglomerated masses, the combination with a mold box, of means for compacting agglomerated masses therein, and a blade movable transversely of said mold-box and adapted to sectionalize the mass being compacted.

36. In apparatus for compacting agglomerated masses, the combination with a mold-box, of means for compacting agglomerated masses therein, means arranged to be moved to supply mixed material to said mold-box, and a blade movable transversely of said mold-box arranged to sectionalize the mass therein and connected to be moved in synchronism with said material supplying means.

37. In apparatus for compacting agglomerated masses, the combination with a mold-box, of a support movable transversely therethrough, a mass supporting means movably disposed astride said support, means independent of said supporting means for applying periodic motion to the under side of said mass supporting means, and means for withdrawing said support from the mold-box.

38. In apparatus for compacting agglomerated masses, the combination with a mold-box, of a support movable transversely therethrough, a mass supporting means movably disposed astride said support, means for applying periodic motion to the under side of said mass supporting means, means for withdrawing said support from the mold-box, and means cooperating with said mass supporting means for subdividing the mass supported thereon.

39. In apparatus for compacting agglomerated masses, the combination with a mold-box, of a support movable transversely therethrough, a mass supporting means movably disposed astride said support, means for applying periodic motion to the under side of said mass supporting means, means for withdrawing said support from the mold-box, and upwardly movable blades disposed on said mass supporting means and adapted to subdivide the mass in substantially vertically planes.

40. In apparatus for compacting agglomerated masses, the combination with a mold-box, of a bottom support mounted to have freedom of motion, and a rotatable cam means, yieldingly mounted and adapted to impart impacts at high frequency to said bottom support; said cam means comprising a grooved shaft and conical sections slidably mounted upon said shaft, whereby said sections may be moved from an operating position imparting impacts to said bottom support to an inoperative position imparting no impacts.

41. In apparatus for compacting agglomerated masses, the combination with a mold-box, of a bottom support mounted to have freedom of motion, and a rotatable cam means yieldingly mounted and adapted to impart impacts at high frequency to said bottom support; said cam means comprising a grooved shaft and a plurality of separable conical sections, said sections being adapted to interlock and slidable as a unit along said shaft when interlocked.

In testimony whereof I affix my signature.

RICHARD BOWEN.